United States Patent
Gupta et al.

(10) Patent No.: US 12,317,083 B2
(45) Date of Patent: May 27, 2025

(54) WIRELESS INTRUSION PREVENTION USING CHANNEL SWITCH ANNOUNCEMENT

(71) Applicant: Arista Networks, Inc., Santa Clara, CA (US)

(72) Inventors: Anubhav Gupta, Navi Mumbai (IN); Pratik Bathe, Pune (IN); Jatin Parekh, Mumbai (IN)

(73) Assignee: Arista Networks, Inc., Santa Clara, CA (US)

( * ) Notice: Subject to any disclaimer, the term of this patent is extended or adjusted under 35 U.S.C. 154(b) by 211 days.

(21) Appl. No.: 18/172,896

(22) Filed: Feb. 22, 2023

(65) Prior Publication Data
US 2024/0284180 A1    Aug. 22, 2024

(51) Int. Cl.
H04W 12/122    (2021.01)
H04W 84/12    (2009.01)

(52) U.S. Cl.
CPC .......... *H04W 12/122* (2021.01); *H04W 84/12* (2013.01)

(58) Field of Classification Search
CPC . H04W 12/122; H04W 84/12; H04W 12/121; H04W 12/08; H04W 88/08; H04W 12/73
See application file for complete search history.

(56) References Cited

U.S. PATENT DOCUMENTS

| | | |
|---|---|---|
| 7,002,943 B2 | 2/2006 | Bhagwat et al. |
| 7,154,874 B2 | 12/2006 | Bhagwat et al. |
| 7,216,365 B2 | 5/2007 | Bhagwat et al. |
| 7,333,481 B1 | 2/2008 | Rawat et al. |
| 7,333,800 B1 | 2/2008 | Gopinath |
| 7,339,914 B2 | 3/2008 | Bhagwat et al. |
| 7,406,320 B1 | 7/2008 | Kumar et al. |
| 7,440,434 B2 | 10/2008 | Chaskar et al. |

(Continued)

FOREIGN PATENT DOCUMENTS

JP    2023000990 A    1/2023

OTHER PUBLICATIONS

Sriram et al., "Detecting and Eliminating Rogue Access Points in IEEE-802.11 WLAN—A Multi-Agent Sourcing Methodology", Feb. 2010, IEEE 2nd International Advance Computing Conference, pp. 256-260 (Year: 2010).*

(Continued)

*Primary Examiner* — Kenneth W Chang
(74) *Attorney, Agent, or Firm* — Treyz Law Group; Jason Tsai

(57) ABSTRACT

A method of operating an access point in a wireless network is provided. The method can include detecting that a client in the wireless network is connecting to, connected to, or communicating with an unauthorized access point. The method can further include using the access point to send a spoofed management frame impersonating the unauthorized access point to the client in response to detecting that the client is connected to or communicating with the unauthorized access point. The spoofed management frame can include a channel switch announcement information element and/or an extended channel switch announcement information element directing the client to switch to a new channel so that the client disconnects from the unauthorized access point.

19 Claims, 5 Drawing Sheets

(56) References Cited

U.S. PATENT DOCUMENTS

| | | | |
|---|---|---|---|
| 7,447,184 | B1 | 11/2008 | Kharvandikar et al. |
| 7,496,094 | B2 | 2/2009 | Gopinath et al. |
| 7,536,723 | B1 | 5/2009 | Bhagwat et al. |
| 7,558,253 | B1 | 7/2009 | Rawat et al. |
| 7,710,933 | B1 | 5/2010 | Sundaralingam et al. |
| 7,751,393 | B2 | 7/2010 | Chaskar et al. |
| 7,764,648 | B2 | 7/2010 | Gopinath et al. |
| 7,804,808 | B2 | 9/2010 | Bhagwat et al. |
| 7,856,209 | B1 | 12/2010 | Rawat |
| 7,856,656 | B1 | 12/2010 | Kharvandikar et al. |
| 7,970,894 | B1 | 6/2011 | Patwardhan |
| 7,971,253 | B1 | 6/2011 | Gupta |
| 8,032,939 | B2 | 10/2011 | Panitkar et al. |
| 8,789,191 | B2 | 7/2014 | Bhagwat et al. |
| 9,003,527 | B2 | 4/2015 | Bhagwat et al. |
| 10,785,703 | B1 | 9/2020 | V et al. |
| 2010/0296496 | A1* | 11/2010 | Sinha ................... H04W 12/12 370/338 |
| 2012/0314663 | A1* | 12/2012 | Dwivedi ............. H04W 36/033 370/329 |
| 2014/0334317 | A1* | 11/2014 | Atreya ................ H04L 63/1416 370/252 |
| 2015/0012971 | A1 | 1/2015 | Ram et al. |
| 2015/0139211 | A1* | 5/2015 | Ji ......................... H04W 12/122 370/338 |
| 2017/0303130 | A1* | 10/2017 | Ram .................... H04W 12/122 |
| 2021/0045052 | A1* | 2/2021 | Nellore ................. H04W 48/20 |
| 2021/0112414 | A1* | 4/2021 | Huang ................ H04W 12/122 |
| 2021/0258983 | A1* | 8/2021 | Inohiza ................. H04W 76/27 |
| 2023/0007487 | A1 | 1/2023 | Jain et al. |

OTHER PUBLICATIONS

Nayarasi, "CWAP—Channel Switch Announcement", Oct. 29, 2014, pp. 1-6, mrn-cciew.

Arista Networks, Inc., Review of Detection, Classification, and Prevention Techniques in WIPS, Arista.com, n.d. (2018), Arista Networks, Inc., Santa Clara, CA, United States.

* cited by examiner

| Element ID | Length | Channel Switch Mode | New Channel Number | Channel Switch Count |
|---|---|---|---|---|

| Element ID | Length | Channel Switch Mode | New Operating Class | New Channel Number | Channel Switch Count |
|---|---|---|---|---|---|

WIRELESS INTRUSION PREVENTION USING CHANNEL SWITCH ANNOUNCEMENT

BACKGROUND

Wireless networks such as Wi-Fi networks can include wireless access points. Client devices can be wirelessly connected to a Wi-Fi network via one or more wireless access points.

A client device authorized to connect to the network may sometimes connect to an unauthorized wireless access point such as a rogue access point or an external access point. A rogue access point can provide a wireless connection to the network that is unauthorized by an administrator of the network. An external access point is part of an outside network. Communications between a client device and an unauthorized access point can result in a network intrusion.

Existing wireless intrusion prevention system (WIPS) methods rely on use of Deauthentication management frames to disrupt such undesired wireless connections. With the implementation of Management Frame Protection (MFP) in the IEEE 802.11w amendment to the IEEE 802.11 standard and with MFP being a mandatory feature in Wi-Fi Protected Access version 3 (WPA3) and Opportunistic Wireless Encryption (OWE), it is no longer possible to disrupt undesired wireless connections using Deauthentication management frames because Deauthentication management frames are encrypted under MFP and cannot be spoofed. It is within this context that the embodiments described herein arise.

BRIEF DESCRIPTION OF THE DRAWINGS

FIG. 4 is a diagram of an illustrative channel switch announcement information element in accordance with some embodiments.

FIG. 5 is a diagram of an illustrative extended channel switch announcement information element in accordance with some embodiments.

DETAILED DESCRIPTION

A computer network can include one or more network elements interconnecting various end hosts in the computer network. Network elements can include network switches, bridges, routers, hubs, repeaters, firewalls, devices serving other networking functions, and devices that include the functionality of two or more of these devices. End hosts of the network can include computers, servers, network service devices, and any other suitable types of specialized or general-purpose host equipment each serving client-side and/or server-side functionalities. End hosts are therefore sometimes referred to as client devices or clients.

Figure 1:
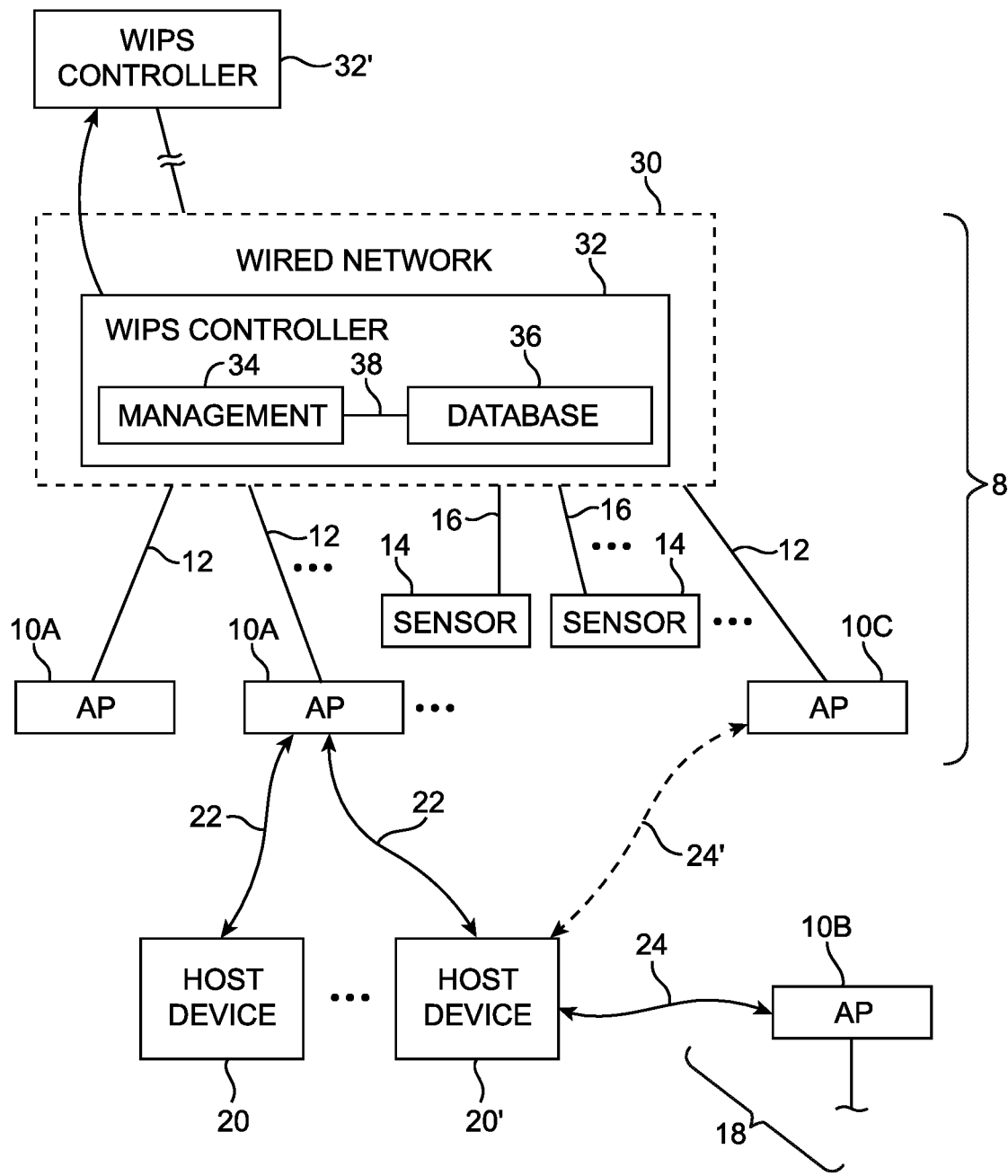
FIG. 1 is a block diagram of an illustrative network having access points wirelessly connected to client devices and implementing a wireless intrusion prevention system (WIPS) in accordance with some embodiments.

To enable wireless connectivity to a computer network, the network can include one or more access points that connect host devices such as client devices to various portions of the network. FIG. 1 is a diagram of an illustrative computer network such as network 8 containing one or more wireless access points such as access points (AP) 10A. In general, network 8 can include one or more access points 10A, two or more wireless access points, three or more wireless access points, four to ten wireless access points, more than ten wireless access points, or any number of wireless points to provide the desired coverage for network 8.

Each access point 10A may be wirelessly connected to one or more host devices 20 via corresponding wireless communications links 22. Host devices 20 can include desktop computers, laptop computers, smartphones, smartwatches, wearable devices, and/or other Wi-Fi-enabled devices. Host devices 20 are sometimes referred to as client devices or clients. Connected in this way, each host device 20 can access or communicate with different portions of network 8 via one or more access points 10A. Network 8 may include any suitable number and/or types of network elements, at least some of which are connected by one or more wired technologies or standards such as Ethernet (e.g., using copper cables and/or fiber optic cables), thus forming a wired network portion 30. As an example, the wireless communications links 22 may be based on IEEE 802.11 standards and Wi-Fi protocols for implementing wireless local area network (WLAN) communications. Data communicated between an access point 10A and a host device 20 or 20' via a corresponding wireless link 22 may be further conveyed to and from other parts of network 8 (e.g., network portion 30) using a corresponding wired path 12, which can be an Ethernet connection.

Access points 10A that are authorized by an administrator of network 8 to provide wireless connectivity to network 8 are sometimes referred to and defined herein as "authorized" access points or "legitimate" access points. In contrast, access points 10B or 10C that are not authorized by the administrator of network 8 or that are present for other malicious purposes can be referred to and defined herein as "unauthorized" access points or "illegitimate" access points. Host or client devices are generally not capable of distinguishing between legitimate and illegitimate access points.

If care is not taken, a host device 20' may establish undesired wireless network connections such as a connection 24 with an unauthorized access point 10B. Host device 20' may be a client device that belongs to the organization of network 8 and/or a client device authorized to operate within network 8. Unauthorized access point 10B may be an external access point that is part of an external network 18 separate from network 8. External network 18 may be part of a malicious attacking or intrusion network. Although access point 10B is part of an external network 18, access point 10B may have the same service set identifier (SSID) as network 8 for the purpose of luring clients to establish a connection. As another example, host device 20' may establish an undesired wireless network connection such as connection 24' with a rogue access point 10C. Rogue access point 10C may be an unauthorized/illegitimate wireless access point operating in the same network 8 as host device 20'. Rogue access point 10C may have the same service set identifier (SSID) as network 8 to lure unsuspecting client devices. Host device 20' communicating with such unauthorized access points via connections 24 and 24' may pose potential security risks to network 8. For instance, host device 20' may divulge sensitive information to an external organization or malicious entity.

In accordance with an embodiment, network 8 may implement a wireless intrusion prevention system (WIPS) configured to detect and disrupt such connections with unauthorized access points. As shown in FIG. 1, network 8 may include a centralized WIPS controller 32 with a management subsystem 34 and/or a database subsystem 36 (e.g., data storage equipment) coupled to management subsystem 34. Portions of the WIPS controller 32 may be implemented on one or more servers. For example, management subsystem 34 may be implemented on one or more management servers or management equipment, whereas database subsystem 36 may be implemented on one or more database servers or database equipment. If desired, management and database functional portions of the WIPS controller 32 may be implemented on one or more stand-alone WIPS devices or using other hardware architectures. In some embodiments, centralized WIPS controller 32 can be omitted.

The example of FIG. 1 in which WIPS controller 32 is implemented within a wired portion of network 8 is merely illustrative. In other embodiments, a WIPS controller may be implemented separately from the wired portion of network 8. As an example, a WIPS controller such as WIPS controller 32' may be implemented on a cloud server or may generally be hosted as an application on other computing equipment. WIPS controller 32' may be connected to access points and sensors in the WIPS over one or more service provider networks such as the Internet and/or over the wired portion of network 8. In general, a WIPS controller may be formed using any suitable equipment communicatively coupled to access points and sensors in the WIPS.

The wireless intrusion prevention system can include radio-frequency sensors such as WIPS sensors 14 that are coupled to WIPS controller 32 via paths 16. The one or more sensors 14 may receive radio-frequency signals in their respective airspaces (e.g., in their vicinities) and may therefore be used to gather sensor data indicative of the radio-frequency environment in which access points 10A, 10B, and 10C, host devices 20, and/or other WLAN devices operate. While WIPS sensors 14 are shown to be separate elements from access points 10A, this is merely illustrative. If desired, one or more access points 10A may, in addition to providing wireless connectivity for client devices, also serve as WIPS sensors that gather sensor data indicative of the operating radio-frequency environment. If desired, one or more access points 10A may include WIPS sensors as part of its hardware.

The sensor data collected by WIPS sensors 14 or by access points 10A with WIPS sensing capability may be conveyed to database subsystem 36 via paths 16 or to access points 10A via paths 12 for storage. Management subsystem 34 may receive the sensor data from database subsystem 36 via path 38 and analyze the stored sensor data to detect undesired (unauthorized or illegitimate) wireless connections such as connections 24 and/or 24'. As examples, based on the sensor data, management subsystem 34 may classify access points as authorized access points 10A or unauthorized access points such as external network access points 10B or rogue access points 10C, may detect client devices 20 with wireless connections to access points 10A, 10B, and/or 10C, may determine whether or not the connected client devices 20 are network-authorized client devices or external network devices, etc., to determine whether an undesired wireless connection is being made by a network client device.

Management subsystem 34 may then take appropriate actions to selectively sever or disrupt the undesired wireless connection or otherwise prevent unauthorized access to network 8. As an example, management subsystem 34 may send information indicative of the undesired wireless connection and can send corresponding commands (e.g., configuration and/or control signals) to one or more access points 10 via paths 12 to cause one or more the access points to attempt to sever the undesired wireless connection.

In general, network paths 12, 16, and 38 connecting various components of the WIPS (e.g., management portion of controller 32, database portion of controller 32, access points 10A, sensors 14, etc.) may be implemented using any suitable connections including one or more Ethernet connections, one or more intervening network elements (e.g., switches, routers, service provider networks, etc.), and other wired or wireless connections.

The example of FIG. 1 in which network 8 includes a centralized WIPS controller 32 to handle the detection and prevention functions described herein is merely illustrative. If desired, network 8 may omit a centralized WIPS controller and/or may use an access point 10A to implement some or all of the operations involved in the detection and prevention of undesired intrusion. As an example, one or more access points 10A, each serving both sensor and wireless connectivity functions, may gather sensor data, store and analyze the gathered sensor data internally on the access point to detect undesired wireless connection(s), and may take preventive measures to selectively sever or otherwise disrupt the undesired wireless connection(s).

Figure 2:
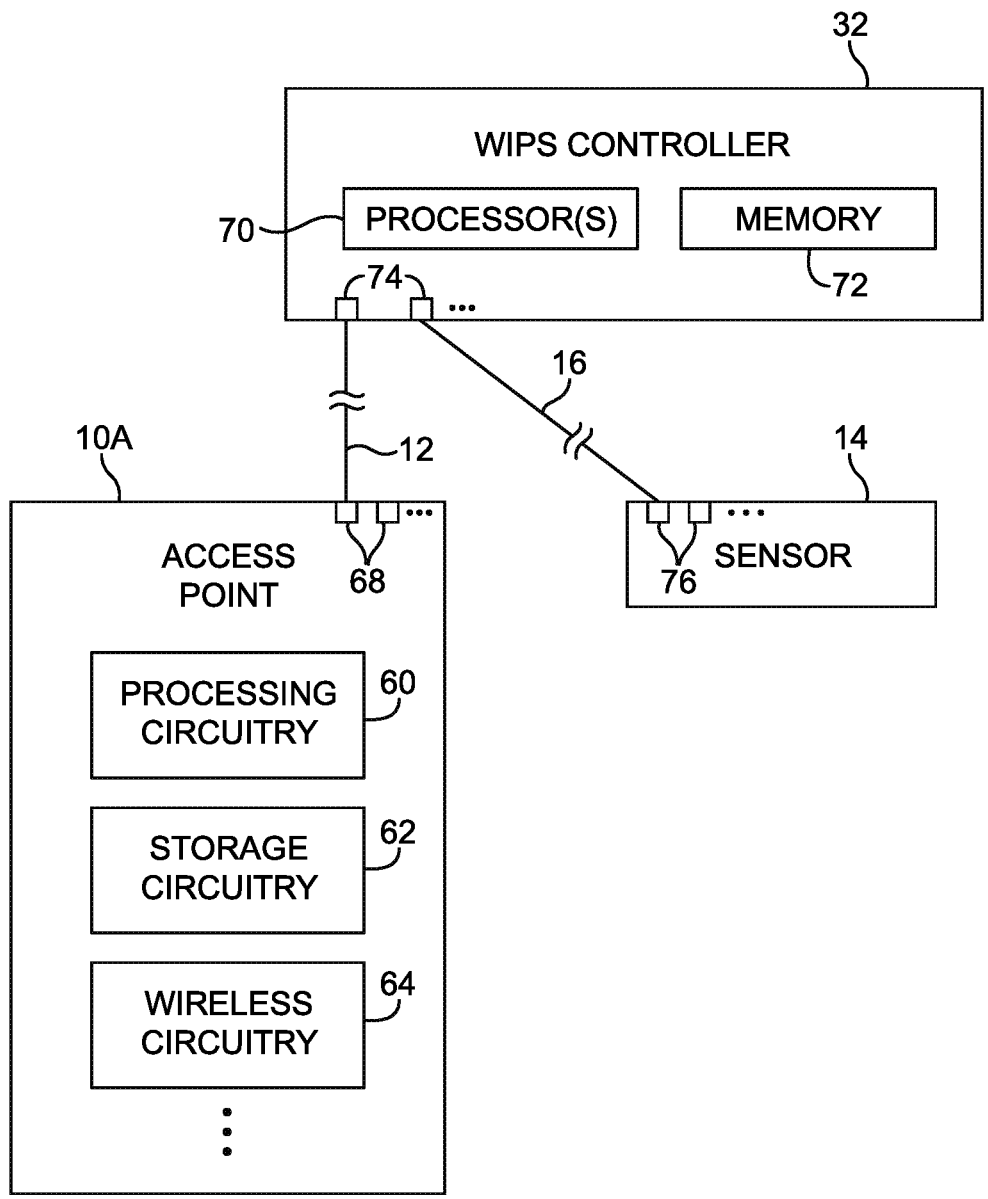
FIG. 2 is a block diagram of an illustrative wireless intrusion prevention system having an access point, a sensor, and control circuitry in accordance with some embodiments.

FIG. 2 is a diagram of illustrative configurations for access point 10A and WIPS controller 32. As shown in FIG. 2, access point 10A (one or more of access points 10A in FIG. 1) may include processing circuitry 60, storage circuitry 62, wireless communications circuitry 64, and other components such as input-output ports 68. Processing circuitry 60 may include one or more processors or processing units based on microprocessors, general-purpose processors, microcontrollers, digital signal processors, programmable logic devices, application specific system processors (ASSPs), application specific integrated circuit (ASIC) processors, etc. Storage circuitry 62 may include volatile memory such as dynamic random-access memory, static random-access memory, etc. and non-volatile memory such as hard-drive storage, solid-state storage, flash memory, etc.

In general, the operations described herein relating to the operation of access point 10A and/or other relevant operations may be stored as (software) instructions on one or more non-transitory computer-readable storage media (e.g., memory circuitry 62) in each access point 10A.

The corresponding processing circuitry (e.g., processing circuitry 60) in each access point for these one or more non-transitory computer-readable storage media may process the respective instructions to perform the corresponding access point operations. Processing circuitry 60 and memory circuitry 62, collectively, may sometimes be referred to herein as the "control circuitry" of access point 10A because the two are often collectively used to control one or more components of access point 10A to perform these operations (e.g., by sending and/or receiving requests, control signals, data, etc.).

To wirelessly communicate with host devices (e.g., client devices), access point 10A may include wireless communication circuitry 64. Wireless communication circuitry 64 may include one or more radios (e.g., Wi-Fi radios), radio-frequency transceiver circuitry, radio-frequency front-end circuitry, and one or more antennas. The one or more radios may use the one or more antennas to transmit radio-frequency signals to and receive radio-frequency signals from one or more client devices. As an example, each of access points 10A in network 8 (FIG. 1) may convey these radio-frequency signals at one or more Wi-Fi frequency bands and, more specifically, at one or more radio-frequency channels in the Wi-Fi frequency bands. While wireless communication circuitry 64 is shown as a separate component from processing circuitry 60, this is merely illustrative. If desired, portions of wireless circuitry 64 (e.g., radio functionalities) may be implemented on portions of processing circuitry 60.

Access point 10A may include other components such as one or more input-output ports 68 such as Ethernet ports or other types of network interface ports that provided connections to other network elements (e.g., routers, modems, controllers, etc.) in the network, power ports through which power is supplied to access point 10A, or other ports. If desired, additional components on access point 10A may include other input-output devices such as devices that provide output to a user such as a display device (e.g., one or more status indicators) and/or devices that gather input from a user such as one or more buttons. If desired, other components on access point 10A may include one or more sensors (e.g., radio-frequency sensors such as sensor circuitry for processing radio-frequency signals for generating sensor data, radio-frequency sensor antennas separate from those described in connection with wireless communication circuitry 64 or shared with antennas in wireless communication circuitry 64, etc.). Each component within access point 10A may be interconnected to one or other components (e.g., to the control circuitry in access point 10A) via one or more paths (e.g., a data bus) that enable the reception and transmission of control signals and/or other data.

Still referring to FIG. 2, WIPS controller 32 may be a centralized WIPS controller for controlling the operation of one or more wireless access points 10A and sensors 14 in network 8. WIPS controller 32 may include processing circuitry 70, memory circuitry 72, and input-output ports 74. In a similar manner as described above in connection with processing circuitry 60, memory circuitry 62, and input-output ports 68 in access point 10A, the corresponding components in WIPS controller 32 may be configured in a similar manner. In particular, processing circuitry 70 may include one or more processors or processing units based on microprocessors on general-purpose processors, microcontrollers, digital signal processors, programmable logic devices, application specific system processors (ASSPs), application specific integrated circuit (ASIC) processors, etc. Memory circuitry 72 may include volatile memory such as dynamic random-access memory, static random-access memory, etc., and non-volatile memory such as hard-drive storage, solid-state storage, flash memory, etc. As an example, portions of processing circuitry 70 and memory circuitry 72 may form part of a server that implements management subsystem 34 and/or storage subsystem 36 of FIG. 1.

The operations described herein relating to the operation of WIPS controller 32 and/or other relevant operations may be stored as (software) instructions on one or more non-transitory computer-readable storage media (e.g., memory circuitry 72) in WIPS controller 32. The processing circuitry (e.g., processing circuitry 70) in WIPS controller 32 for these one or more non-transitory computer-readable storage media may process the respective instructions to perform the corresponding WIPS controller operations. Processing circuitry 70 and memory circuitry 72, collectively, may sometimes be referred to herein as the "control circuitry" of WIPS controller 32 because the two are often collectively used to control one or more components of WIPS controller 32 to perform these operations (e.g., by sending and/or receiving requests, control signals, data, etc.).

Input-output ports 74 of WIPS controller 32 may include Ethernet ports or other types of network interface ports that provided connections to other network elements (e.g., switches, routers, modems, controllers) in the network, power ports through which power is supplied to WIPS controller 32, or other ports. In the example of FIG. 2, port 74 of WIPS controller 32 is coupled to port 68 of access point 10A, thereby forming a connection path 12. Path 12 may enable WIPS controller 32 and access point 10A to convey control signals (or commands) or other configuration information between them, thereby serving as a communication path. Path 12 may be a direct path (e.g., WIPS controller 32 is connected to access point 10 via no other intervening network nodes or elements) or an indirect path (e.g., WIPS controller 32 is connected to access point 10A via one or more intervening network nodes or elements). Each access point 10A in network 8 (FIG. 1) may be coupled to and therefore communicate with centralized controller 32 using any of the above-mentioned means. If desired, each access point 10A in network 8 may be coupled to multiple portions of WIPS controllers 32 (e.g., separately coupled to management equipment 34 and to database equipment 36).

In some illustrative arrangements in which dedicated sensors 14 are included in the WIPS of network 8, some of ports 74 of WIPS controller 32 may be coupled to a sensor 14 (e.g., to a corresponding port 76 of sensor 14). Path 16 connecting WIPS controller 32 to sensor 14 may enable WIPS controller 32 and sensor 14 to convey control signals, sensor signals, commands, or other configuration information or data between them. Similar to path 12, path 16 may be a direct path or an indirect path.

Sensor 14 may have some of the same components as access point 10A in order to perform its sensing functions (e.g., sensor 14 may include processing circuitry, memory circuitry, wireless communication circuitry, etc.). As such, in some illustrative arrangements, access point 10A may use its components to perform radio-frequency sensing functions in addition to its wireless connectivity functions, and a dedicated sensor 14 may be omitted.

In some illustrative arrangements, a separate centralized WIPS controller 32 may be omitted from network 8. In particular, in these arrangements, access point 10A may individually perform intrusion detection and prevention operations that would otherwise be performed by a centralized WIPS controller. As examples, access point 10A may gather sensor data internally or using separate dedicated sensors 14, may store and/or analyze the gathered sensor data to detect undesired connections, and may perform suitable prevention operations.

As described in the background, Deauthentication management frames can be used to disrupt the undesired wireless connections. With the implementation of the Management Frame Protection (MFP) security feature, however, it may no longer be possible to disrupt the undesired wireless connections using Deauthentication management frames as they are now protected or encrypted under MFP. In a network employing MFP, wireless access points in the network can still send unencrypted (unprotected) management frames such as beacon frames, probe response frames, and spectrum management frames to a client device.

The wireless intrusion prevention system can detect, using one or more sensors 14, that a client in the network is attempting to connect or is connected to an unauthorized access point. In accordance with some embodiments, an authorized access point such as 10A may, in response to detecting such undesired connection, send the client a spoofed management frame having channel switch announcement (CSA) and/or extended channel switch announcement (eCSA) information elements directing the client to switch to a new channel. Directing a client to switch to a new channel can disconnect the client from a rogue/external access point and can prevent new clients from connecting to rogue/external access points. Operating a network in this way can be beneficial and technically advantageous by protecting in-network clients from communicating with unauthorized access points (e.g., to ensure confidentiality of sensitive information) when upgrading to newer network security standards that inhibit the use of spoofed Deauthentication frames.

Figure 3:
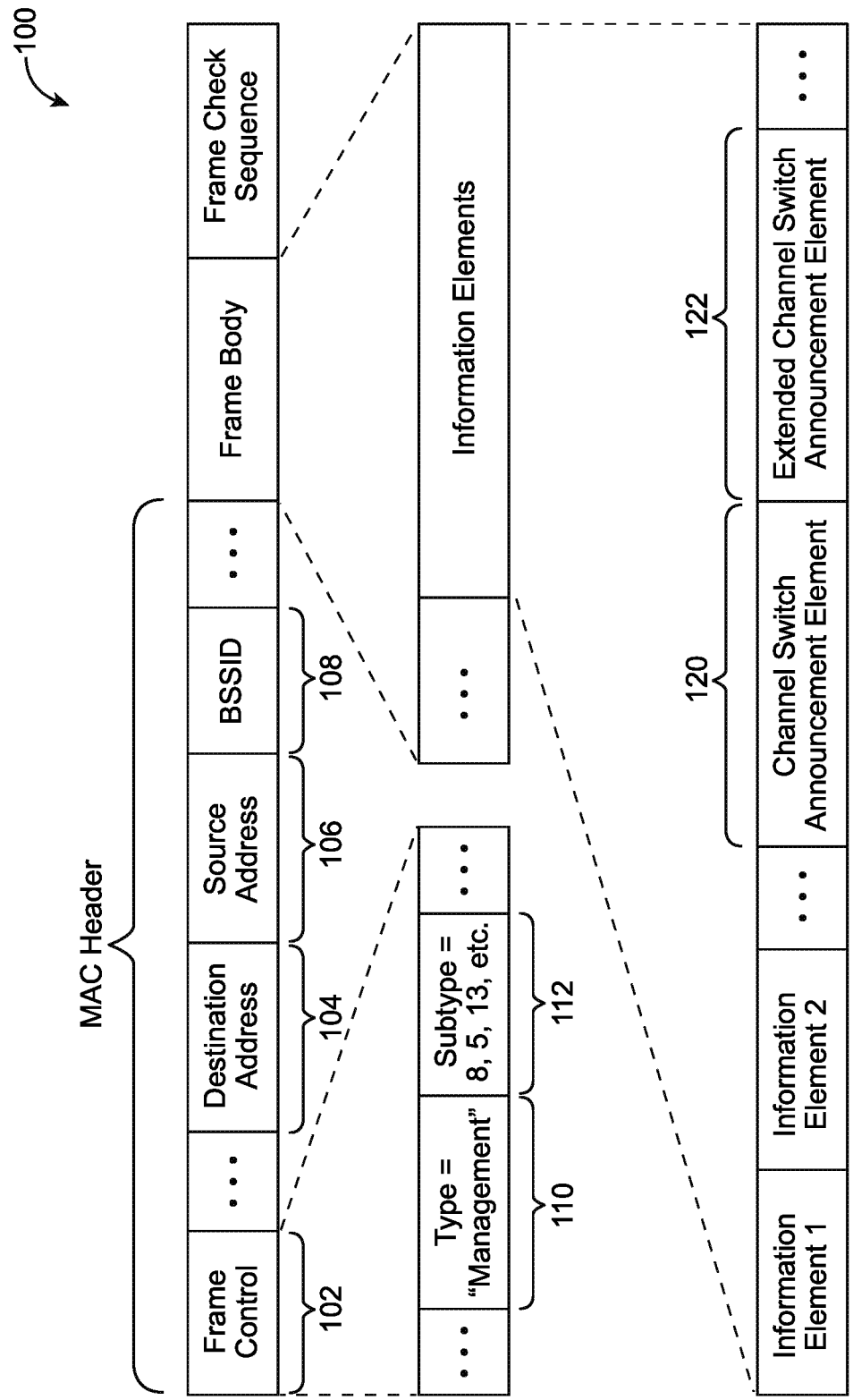
FIG. 3 is a diagram of an illustrative management frame having channel switch announcement (CSA) and extended channel switch announcement (eCSA) information elements in accordance with some embodiments.

FIG. 3 is a diagram of an illustrative management frame such as management frame 100 having channel switch announcement (CSA) and extended channel switch announcement (eCSA) information elements in accordance with some embodiments. As shown in FIG. 3, management frame 100 can include, among other fields, a frame control field 102, address fields such as a destination address field 104 and a source address field 106, a basic service set identifier (BSSID) field 108, a frame body, and a frame check sequence. Frame control field 102, destination address field 104, source address field 106, BSSID field 108, and other fields are sometimes considered part of a MAC header preceding the frame body. The frame control field 102 contains information on the frame type, protocol version, and various flags. The destination address field 104 contains the MAC address of the device to which the current frame is being sent. The source address field 106 contains the MAC address of the device sending the current frame. In some embodiments, the MAC header can also include a receiving address field and a transmitting address field. The receiving address field can include the same value as the destination address field 104. The transmitting address field can include the same value as the source address field 106.

The BSSID field 108 contains the MAC address of the wireless access point or the wireless network the access point is associated with. In the context of channel switch announcements, the BSSID can be used to identify the specific wireless network or BSS that is announcing the channel switch event. When a client receives a channel switch announcement, the client can use the BSSID to determine which wireless network or BSS the announcement is referring to and adjust its own channel accordingly. The frame check sequence contains a cyclic redundancy check value that is used to check for errors in the frame.

The frame control field 102 can be a frame type field 110 and a frame subtype field 112. Management frames 100 have a frame type field 110 with a value of "0." The subtype field 112 determines the type of management frame that is being sent. For example, a subtype field 112 with a value of "8" corresponds to a beacon frame or a beacon management frame. As another example, a subtype field 112 with a value of "5" corresponds to a probe response frame or a probe response management frame. The main difference between a probe response frame and a beacon frame is that a probe response frame is typically sent in response to a probe request from a client device, whereas a beacon frame is typically sent periodically by an access point to announce its presence to other devices in its vicinity. As another example, a subtype field 112 with a value of "13" corresponds to an action frame such as a spectrum management frame. Beacon frames, probe response frames, and spectrum management frames are different types of management frames 100 that are unencrypted (unprotected) and can therefore be spoofed. There can be other types of management or action frames with other subtype values.

The frame body can include information elements. A frame can include two to ten information elements, 10 to 20 information elements, 20-30 information elements, more than 30 information elements, or other number of information elements. In particular, management frame 100 can include a channel switch announcement (CSA) information element 120 and an extended channel switch announcement (eCSA) information element 122. Information elements 120 and 122 can both be considered channel switch announcements. Channel switch announcements are information elements used by an access point in a wireless network to advertise when the access point is changing to a new channel and also to advertise the channel number of the new channel. Channel switch announcements can coordinate the use of channels among multiple network devices and are often used in dynamic frequency selection (DFS) schemes to ensure that wireless networks do not interfere with critical radar systems that are typically reserved by defense, airports, or other public authorities. DFS can thus help ensure that wireless access points and clients can coexist with existing radar systems and avoid causing interference.

FIG. 4 is a diagram of an illustrative channel switch announcement (CSA) information element 120 in accordance with some embodiments. CSA information element 120 can be used to announce channel changes to all devices and is used in wireless networks that use a single channel. As shown in FIG. 4, CSA information element 120 includes an element identifier (ID) field, a length field, a channel switch mode field, a new channel number field, and a channel switch count field. The element ID is a field that identifies the information element as a CSA or an eCSA element. The length field is a field that indicates the length of the CSA element. The channel switch mode is a field that indicates the mode of the channel switch. A channel switch mode with a value of "0" specifies continued transmission until the channel switch event, whereas a value of "1" specifies immediate termination of transmissions until the channel switch event. The channel switch mode can have a valid or legitimate value of either "0" or "1".

The new channel number field is a field that specifies the channel number of the new channel to which the access point will be switching. The channel switch count is a field that indicates the number of beacon intervals before the channel switch event. A channel switch count value of "1" specifies that the channel switch occurs immediately before the next target beacon transmission time (TBTT), whereas a channel switch count value of "0" specifies that the channel switch can occur at any time after the frame containing the CSA element is transmitted. The target beacon transmission time can refer to a period of sending or receiving beacon actions in a scheduled time, as determined by a beacon interval.

FIG. 5 is a diagram of an illustrative extended channel switch announcement (eCSA) information element 122 in accordance with some embodiments. eCSA information element 122 can be used to announce channel changes to all devices and is used in wireless networks that use multiple channels. As shown in FIG. 5, the eCSA information element 122 includes an element identifier (ID) field, a length field, a channel switch mode field, a new operating class field, a new channel number field, and a channel switch count field. The element ID is a field that identifies the information element as a CSA or an eCSA element. The length field is a field that indicates the length of the eCSA element. The channel switch mode is a field that indicates the mode of the channel switch. A channel switch mode with a value of "0" specifies continued transmission until the channel switch event, whereas a value of "1" specifies immediate termination of transmissions until the channel switch event.

The new operating class field is a field that indicates the operating class of the new channel. Only an eCSA element has a new operating class field. The new operating class may include, for example, bandwidth and regulatory information. The new channel number field is a field that specifies the channel number of the new channel to which the access point will be switching. The channel switch count is a field that indicates the number of beacon intervals before the channel switch event. A channel switch count value of "1" specifies that the channel switch occurs immediately before the next target beacon transmission time (TBTT), whereas a channel switch count value of "0" specifies that the channel switch can occur at any time after the frame containing the CSA element is transmitted.

Figure 6:
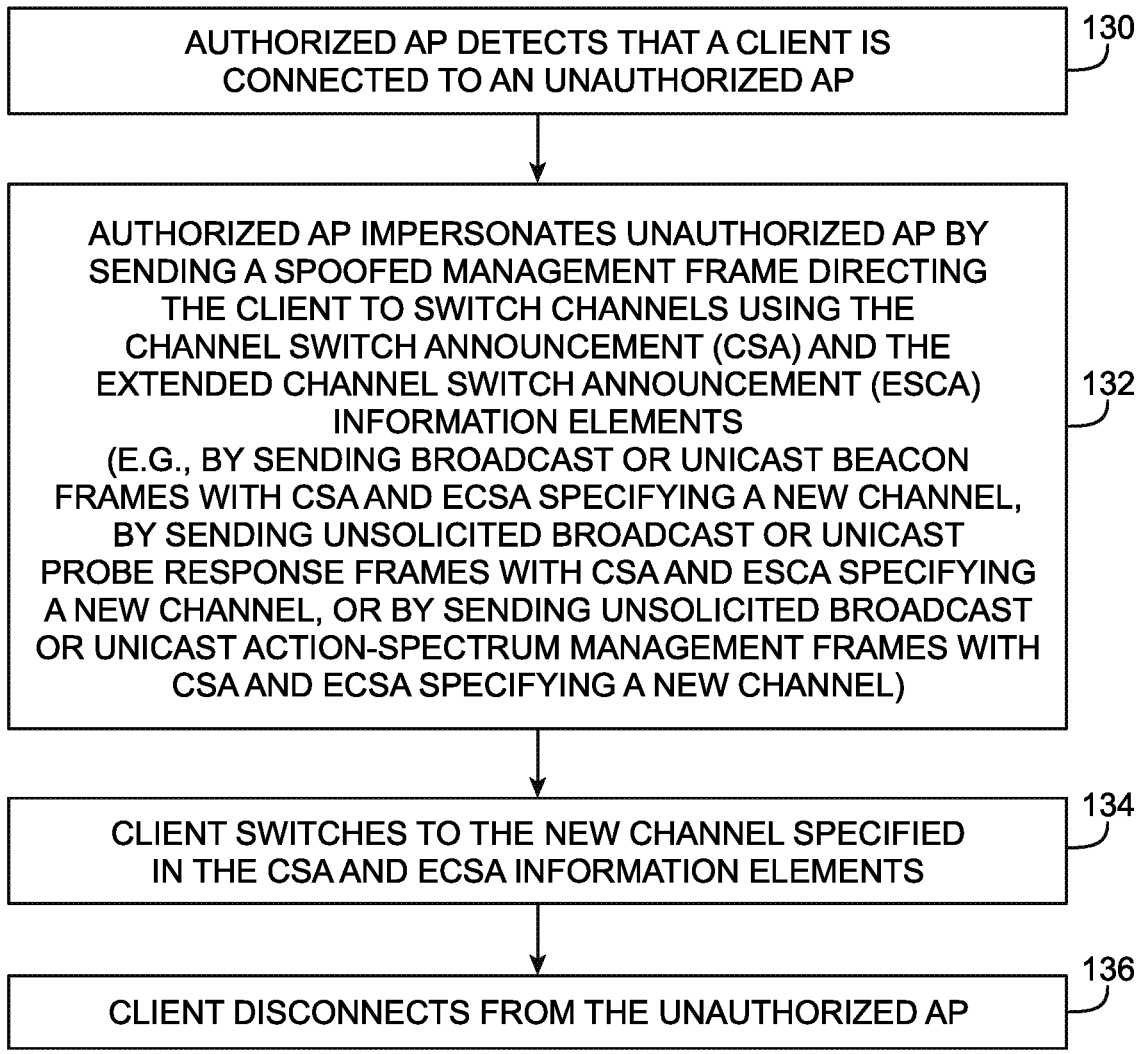
FIG. 6 is a flow chart of illustrative steps for performing wireless intrusion prevention using channel switch announcements in accordance with some embodiments.

FIG. 6 is a flow chart of illustrative steps for performing wireless intrusion prevention using channel switch announcements in accordance with some embodiments. During the operations of block 130, an authorized access point (e.g., a legitimate corporate access point in a corporate network) can detect that a client is connected to or is communicating with an unauthorized access point. For example, the authorized access point can use one or more sensors to detect when a corporate client (host) device is connected to an in-network rogue access point or an external out-of-network access point.

During the operations of block 132, the authorized access point can impersonate the unauthorized access point by sending a spoofed management frame directing the client to switch to a new channel using CSA and/or eCSA information elements. A "spoofed" management frame can refer to and be defined herein as a frame that impersonates an unauthorized access point by using the same BSSID or MAC address as the unauthorized access point. Channel switch announcements can be specific or general. A specific mode can be used when a predefined set of clients needs to be disallowed to transmit data to an unauthorized access point. 802.11 unicast frames can be employed during the specific mode. A general mode can be used to prevent any (or all) clients from transmitting data to an unauthorized access point. 802.11 broadcast frames can be employed during the general mode. In accordance with some embodiments, 802.11 beacon frames, probe response frames, and action frames having CSA and eCSA information elements can be used to disrupt a connection between a client and an unauthorized access point. This technique can be used on 2.4 GHz, 5 GHz, 6 GHz, and other frequencies supported by the IEEE 802.11 protocol.

As an example, an authorized access point (AP) can broadcast beacon frames to disrupt communications between an authorized client and an unauthorized AP. An authorized AP can broadcast spoofed 802.11 beacon frames with CSA and eCSA information elements both specifying a different channel in the "new channel number" field than what the unauthorized AP is currently using. Spoofing makes it appear as if the frames are coming from the unauthorized AP. At 2.4 GHz, there can be channel numbers 1-14. The CSA/eCSA elements may direct the client(s) to switch from channel #1 to a new channel number as far as possible (e.g., to channel #14). At 5 GHz, there can be channel numbers 36, 40, 44, 48 in a first uni-band, channel numbers 52, 56, 60, 64 in a second uni-band, channel numbers 100, 104, 108, . . . , 136, 140 in a third uni-band, and channel numbers 149, 153, 157, 161, 165 in a fourth uni-band. The CSA/eCSA elements may direct the client(s) to switch from channel #56 in the first uni-band to a new channel number as far as possible in a different uni-band (e.g., to channel #165 in the fourth uni-band). These examples are merely illustrative. This ensures that the client switches to a new channel and then disconnects from the unauthorized AP (see block 134), hence disrupting the unsanctioned communications link so that the client disconnects from the unauthorized AP (see block 136). The CSA and the eCSA can set the "channel switch mode" field equal to "1," which directs the client(s) to stop all transmissions immediately. As another example, an authorized access point (AP) can transmit unicast beacon frames to disrupt communications between an authorized client and an unauthorized AP. Unlike broadcast beacon frames, unicast beacon frames can have the "destination address" field changed to the MAC address of only the target client(s), thus ensuring that other client devices are not affected.

As another example, an authorized AP can transmit unsolicited unicast probe response frames to disrupt communications between an authorized client and an unauthorized AP. The term "unsolicited" means that a probe response frame is sent without needing an associated probe request frame. An authorized AP can continuously send unsolicited spoofed 802.11 probe response frames with CSA and eCSA information elements both specifying a different channel in the "new channel number" field than what the unauthorized AP is currently using (e.g., to direct the client to switch to a new channel number as far as possible from the current channel). Spoofing makes it appear as if the frames are coming from the unauthorized AP. This ensures that the client switches to a new channel and subsequently disconnects from the unauthorized AP (see block 134), hence disrupting the unsanctioned communications link so that the client disconnects from the unauthorized AP (see block 136). The CSA and the eCSA can set the "channel switch mode" field equal to "1," which directs the client(s) to stop all transmissions immediately. As another example, an authorized AP can broadcast unsolicited probe response frames to disrupt communications between an authorized client and an unauthorized AP. Unlike unicast probe response frames, broadcast probe response frames can have the "destination address" field changed to the broadcast address (e.g., ff:ff:ff:ff:ff:ff), which is processed by every client that is connected to the unauthorized AP.

As another example, an authorized AP can broadcast action frames such as spectrum management frames to disrupt communications between an authorized client and an unauthorized AP. An authorized AP can continuously broadcast unsolicited spoofed 802.11 spectrum management frames having CSA and eCSA information elements both specifying a different channel in the "new channel number" field than what the unauthorized AP is currently using (e.g., to direct the client to switch to a new channel number as far as possible from the current channel). Spoofing makes it appear as if the frames are coming from the unauthorized AP. This ensures that the client switches to a new channel and disconnects from the unauthorized AP (see block 134), hence disrupting the unsanctioned communications link so that the client disconnects from the unauthorized AP (see block 136). The CSA and the eCSA can set the "channel switch mode" field equal to "1," which directs the client(s) to stop all transmissions immediately. As another example, an authorized AP can transmit unicast spectrum management frames to disrupt communications between an authorized client and an unauthorized AP. Unlike broadcast spectrum management frames, unicast spectrum management frames can have the "destination address" field changed to the MAC address of only the target client(s), thus ensuring that other client devices are not affected.

The operations of FIG. 6 are merely illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

The methods and operations described above in connection with FIGS. 1-6 may be performed by the components of one or more network device(s) using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., using processing circuitry 60 or 70 of FIG. 2).

The foregoing is merely illustrative and various modifications can be made to the described embodiments. The foregoing embodiments may be implemented individually or in any combination.

What is claimed is:

1. A method of operating an access point in a wireless network, the method comprising:
   detecting that a client in the wireless network is connecting or connected to an unauthorized access point; and
   in response to detecting that the client is connecting or connected to the unauthorized access point, using the access point to send a spoofed management frame impersonating the unauthorized access point to the client, wherein the spoofed management frame includes a channel switch announcement (CSA) information element specifying a new channel number for the access point and an extended channel switch announcement (eCSA) information element specifying the new channel number for the access point, and wherein the CSA information element and the eCSA information element are configured to direct the client to switch to the new channel number.

2. The method of claim 1, wherein the spoofed management frame comprises a broadcast or unicast beacon frame.

3. The method of claim 1, wherein the spoofed management frame comprises an unsolicited broadcast or unicast probe response frame.

4. The method of claim 1, wherein the spoofed management frame comprises an unsolicited action frame.

5. The method of claim 4, wherein the spoofed management frame comprises an unsolicited broadcast or unicast spectrum management frame.

6. The method of claim 1, wherein the CSA information element and the eCSA information element each have a channel switch mode field with a valid value.

7. The method of claim 1, wherein the spoofed management frame includes a MAC address of the unauthorized access point.

8. The method of claim 1, wherein directing the client to switch to the new channel number causes the client to disconnect from the unauthorized access point.

9. The method of claim 1, wherein the unauthorized access point comprises a rogue access point that is part of the wireless network.

10. The method of claim 1, wherein the unauthorized access point comprises an external access point that is outside of the wireless network.

11. A non-transitory computer-readable storage medium storing one or more programs configured to be executed by an access point in a wireless network, the one or more programs including instructions for:
    detecting that a client in the wireless network is communicating with an illegitimate access point; and
    in response to detecting that the client is communicating with the illegitimate access point, transmitting from the access point a spoofed management frame that includes a channel switch announcement specifying a new channel number for the access point and an extended channel switch announcement specifying the new channel number for the access point, wherein the channel switch announcement and the extended channel switch announcement direct the client to switch to the new channel number so that the client disconnects from the illegitimate access point.

12. The non-transitory computer-readable storage medium of claim 11, wherein the spoofed management frame comprises a unicast or broadcast beacon frame having a basic service set identifier of the illegitimate access point.

13. The non-transitory computer-readable storage medium of claim 11, wherein the spoofed management frame comprises an unsolicited unicast or broadcast probe response frame having a basic service set identifier of the illegitimate access point.

14. The non-transitory computer-readable storage medium of claim 11, wherein the spoofed management frame comprises an unsolicited unicast or broadcast action frame having a basic service set identifier of the illegitimate access point.

15. The non-transitory computer-readable storage medium of claim 11, wherein the spoofed management frame comprises an unsolicited unicast or broadcast spectrum management frame having a basic service set identifier of the illegitimate access point.

16. The non-transitory computer-readable storage medium of claim 11, wherein the channel switch announcement and the extended channel switch announcement each have a channel switch mode field with a value that directs the client to stop transmitting data in response to receiving the spoofed management frame.

17. A system comprising:
    a client; and
    an authorized access point having wireless circuitry and configured to
       detect when the client is connecting or connected to an unauthorized access point, and
       disrupt the connection between the client and the unauthorized access point by sending a management frame that includes a channel switch announcement (CSA) specifying a new channel number for the authorized access point and an extended channel switch announcement (eCSA) specifying the new channel number for the authorized access point, wherein the CSA and the eCSA direct the client to switch to the new channel number.

18. The system of claim 17, wherein the management frame comprises an IEEE 802.11 frame selected from the group consisting of: a beacon frame, a probe response frame, and an action frame.

19. The system of claim 17, wherein the management frame comprises a spoofed management frame that includes a MAC address of the unauthorized access point.

* * * * *